(12) United States Patent
Braun et al.

(10) Patent No.: US 8,302,361 B2
(45) Date of Patent: Nov. 6, 2012

(54) PANEL, ESPECIALLY FLOOR PANEL

(75) Inventors: Roger Braun, Willisau (CH); Carsten Groeke, Berlin (DE)

(73) Assignee: Kronotec AG, Luzern (CH)

( * ) Notice: Subject to any disclaimer, the term of this patent is extended or adjusted under 35 U.S.C. 154(b) by 663 days.

(21) Appl. No.: 12/282,838

(22) PCT Filed: Mar. 25, 2008

(86) PCT No.: PCT/EP2008/002336
§ 371 (c)(1),
(2), (4) Date: Jan. 21, 2009

(87) PCT Pub. No.: WO2008/116623
PCT Pub. Date: Oct. 2, 2008

(65) Prior Publication Data
US 2010/0300029 A1   Dec. 2, 2010

(30) Foreign Application Priority Data
Mar. 26, 2007   (DE) .......................... 10 2007 015 048

(51) Int. Cl.
*E04B 2/00*   (2006.01)
(52) U.S. Cl. ............. 52/588.1; 52/390; 52/539; 428/50
(58) Field of Classification Search ................. 52/588.1, 52/582.1, 582.2, 587.1, 586.1, 586.2, 585.1, 52/578, 390, 392, 533, 534, 549, 553, 589.1, 52/590.2, 590.3, 591.1, 591.2, 591.4, 591.5, 52/592.1, 582.4, 745.07, 745.19, 747.1, 747.11, 52/748.1, 74.11; 403/334, 345, 364–368, 403/372, 375, 376, 381; 404/34, 35, 40, 404/41, 46, 47, 49–58, 68, 70; 428/44, 47–50, 428/57, 58, 60, 61, 106, 192–194
See application file for complete search history.

(56) References Cited

FOREIGN PATENT DOCUMENTS

| | | |
|---|---|---|
| DE | 201 12 474.2 | 1/2001 |
| DE | 102 24 540.1 | 12/2003 |
| EP | 1 279 778 | 1/2003 |
| EP | 1 350 904 | 10/2003 |
| EP | 1 650 375 | 12/2007 |
| FR | 2826391 | * 12/2002 |
| FR | 2826391 A1 | * 12/2002 |
| WO | 2007/020088 | 2/2007 |

OTHER PUBLICATIONS

Written Opinion of International Searching Authority for PCT/EP2008/002336.

* cited by examiner

*Primary Examiner* — William Gilbert
(74) *Attorney, Agent, or Firm* — Andrew M. Calderon; Roberts Mlotkowski Safran & Cole, P.C.

(57) ABSTRACT

A panel, in particular floor panel (1, 2), with a core of wood material or a wood material/plastic mixture (17), a top side (18) and a bottom side (19), which panel has on at least two opposite lateral edges (I, II) a profiling corresponding to one another such that two identically embodied panels (1, 2) can be connected and locked to one another by an essentially vertical joining motion in the horizontal (H) and vertical (V) directions, wherein the locking in the vertical direction (V) can be brought about by at least one tongue element (3) movable in the horizontal direction (H), which element snaps into place during the joining motion behind a locking edge (4) extending essentially in the horizontal direction (H), is characterized in that the tongue element (3) is formed in one piece out of the core (17).

20 Claims, 6 Drawing Sheets

PANEL, ESPECIALLY FLOOR PANEL

BACKGROUND OF THE INVENTION

1. Field of the Invention

The invention relates to a panel, in particular a floor panel, with a core made of wood material or a wood material/plastic mixture, a top side and a bottom side, which panel has on at least two opposite lateral edges a profiling corresponding to one another such that two identically embodied panels can be connected and locked to one another by an essentially vertical joining motion in the horizontal and vertical directions, wherein the locking in the vertical direction can be brought about by at least one tongue element movable in the horizontal direction, which element snaps into place during the joining motion behind a locking edge extending essentially in the horizontal direction.

2. Discussion of Background Information

A panel of this type is known, for example, from EP 1 650 375 A1. This type of locking implemented with this panel is preferably provided on the transverse side of floor panels. But it can also be provided on the longitudinal side or on both the longitudinal and the transverse sides. The tongue element is made of plastic and is inserted into a groove extending horizontally on one of the lateral edges and is beveled on its top side. Like a door latch, the bevel causes the tongue element to be pressed inward into the groove by the panel to be newly fitted when the bottom side of this panel touches the beveling and is lowered further. When the panel to be newly attached has been lowered completely to the tuider-floor, the tongue element snaps into a groove introduced horizontally in the opposite lateral edge and locks the two panels in the vertical direction. Special injection molding tools are required for the manufacture of this tongue element, so that the production is relatively expensive. Furthermore, a high-quality plastic has to be used to provide adequate strength values, which makes the tongue element even more expensive. If plastics with insufficient strength values are used, this leads to relatively large dimensions of the tongue elements, since this is the only way to ensure that corresponding forces can be produced or transferred.

The fact that the locking element is embodied as a separate component causes additional expenses. For technological reasons the production of the locking element takes place in a location separate from the panels, so that an integration into the continuous production process, in particular for floor panels, if anything is impossible. Because of the different materials, wood material on the one hand and plastic on the other hand, it is complex and cost-intensive to match the manufacturing tolerances from two separate production processes. Since the locking in the vertical direction would be ineffective if the locking element were missing, this element must further be safeguarded from falling out of the groove introduced into the lateral edge during the further production process and during transport. This securing is also complex. As an alternative, the locking element could also be provided separately to the consumer.

With increasing frequency the floor panels under discussion are laid by do-it-yourselfers, so that it is basically possible through a lack of experience for the required number of locking elements to be misjudged at first and for them not to be procured in an amount sufficient to finish a room. Furthermore, it cannot be ruled out that the do-it-yourselfer may make a mistake when inserting the tongue element, which means that the locking is not possible in an exact manner and causes the interconnection to release over time, which the consumer then incorrectly attributes to the quality delivered by the producer.

From DE 102 24 540 A1 panels are known that are profiled on opposite lateral edges such that hook-shaped connecting elements form for locking in the horizontal direction. For locking in the vertical direction, the connecting elements are provided with form-fitting elements spaced apart from one another horizontally and vertically and with undercuts corresponding to them with one horizontally oriented locking surface each. The transverse extension of horizontally oriented locking surfaces of this type is about 0.05 to 1.0 mm. The dimensioning must be so small for the joining of two panels to remain possible at all. But this inevitably leads to the fact that only small, vertically directed forces can be absorbed, so that extremely low tolerances must be used during manufacture to ensure that the connection does not spring open with normal stress even in the case of minor floor unevenness and/or soft undersurfaces.

Based on this problem, the panel described at the outset is to be improved.

SUMMARY OF THE INVENTION

To solve the problem, a generic floor panel is characterized in that the tongue element is formed in one piece out of the core.

This embodiment drastically simplifies production. There is no matching of tolerances of different components. Manufacture times and expenses are reduced, because it is not necessary to bring and keep together different components. Furthermore, it is ensured that the end consumer is not missing any components and unable to continue his work.

Preferably, the at least one tongue element is free with respect to the core in the direction of the top side and in the direction of the opposite lateral edge, and connected to the core on at least one end, particularly preferably on both ends, in the direction of its lateral edge. The tongue elasticity can be adjusted through the size of the effective connection of the tongue element to the core.

The tongue element is preferably exposed by means of a horizontal and a vertical slit. Not only does the width of the slits determine the strength of the link of the tongue element to the core material, but the choice of the width of the vertical slit also makes it possible to create a stop for the tongue element in the horizontal direction, so that the tongue element is safely protected against overstretching.

If a plurality of tongue elements spaced apart from one another is provided over the length of the lateral edge, the stability of the connection is increased because the free spring deflection in the longitudinal direction of the tongue element is limited. It is possible to select the distance between the individual tongue elements to be larger or smaller. The smaller the distance, the larger naturally the effective surface for locking, so that the transferable forces in the vertical direction are correspondingly high.

The horizontal locking preferably takes place by means of hook elements corresponding to one another, the hook element on the lateral edge having the locking edge being embodied by a shoulder projecting in the direction of the top side, and the hook element on the lateral edge having the tongue element being embodied by a shoulder directed in the direction of the bottom side.

If the outer edge of the tongue element runs tilted at an angle to the top side, the joining motion is facilitated because with increasing motion the tongue element deflects deeper in the direction of the panel core.

The locking edge running essentially horizontally is preferably the sidewall of a groove introduced into the lateral edge.

But the locking edge running essentially horizontally can also be formed by a projection protruding outward on the projecting shoulder. In this case it is then advantageous if the tongue element ends on the bottom side of the panel.

In order to achieve a safest possible locking in the vertical direction, the shoulder projecting downward can have an at least partially flat top surface that ends in the same horizontal plane as a bearing surface embodied on the opposite lateral edge, so that two panels connected to one another can support each other.

If the hook elements are embodied such that there is a preload at the joint of two panels connected to one another, the lateral edges of the panels are pressed against one another with their vertical surfaces in the area of the top side, through which a tight connection on the top side of the plate can be achieved and the formation of gaps can be prevented.

BRIEF DESCRIPTION OF THE DRAWINGS

The following exemplary embodiments of the invention are described with the aid of The drawings show.

DETAILED DESCRIPTION OF THE PRESENT INVENTION

Figure 1:
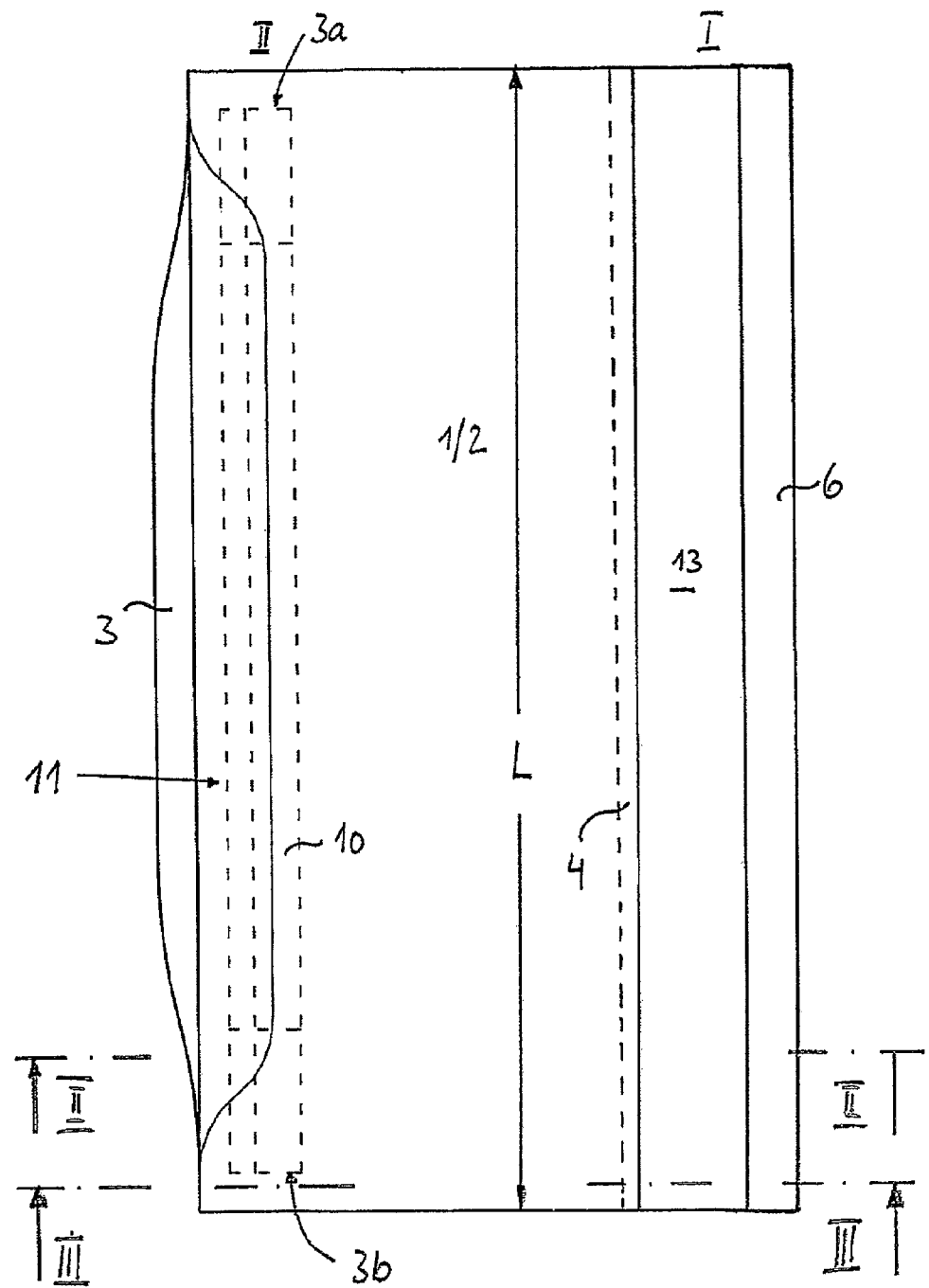
FIG. 1 shows a top view of a first panel.

The panels 1, 2 are embodied identically. They comprise a core 17 of wood material or a wood material/plastic mixture. On their opposite lateral edges I, II the panels 1, 2 are profiled, the lateral edge I being milled from the top side 18 and the lateral edge II being milled from the bottom side 19. The tongue element 3 is embodied on the lateral edge II, which element was produced by cutting free the core 17 in that a horizontal slit 11 and a slit 10 running essentially vertically were milled. The lateral edges I, II have the length L. In the longitudinal direction of the lateral edge II, the tongue element 3 is connected on its ends 3a, 3b to the core material. The exposure of the tongue element 3 from the core 17 occurs through the slits 10, 11 only. The outer edge 3c of the tongue element 3 is tilted at the angle α with respect to the top side 18 of the panel 2. The vertical surfaces of the lateral edges I, II are machined such that mating surfaces 15, 16 form in the area of the top side 18.

On the lateral edge I opposite the tongue element 3, the panel 1 is provided with a groove 9 extending essentially in the horizontal direction H, the upper sidewall of which groove embodies a locking edge 4 running essentially horizontally. As shown in the figures, the groove bottom of the groove 9 runs parallel to the outer edge 3c of the tongue element 3, which facilitates the manufacture of the groove 9, but it could also be made strictly in the vertical direction or at an angle deviating from the angle α.

Figure 4:
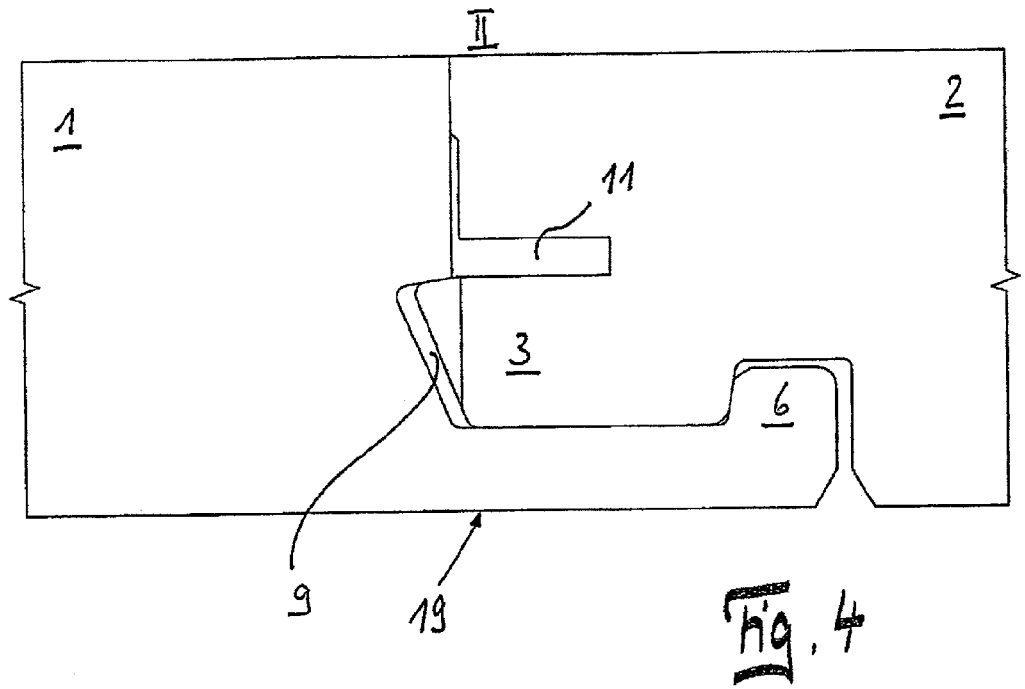
FIG. 4 shows a first variation of the panel according to FIGS. 2 and 3.
Figure 5:
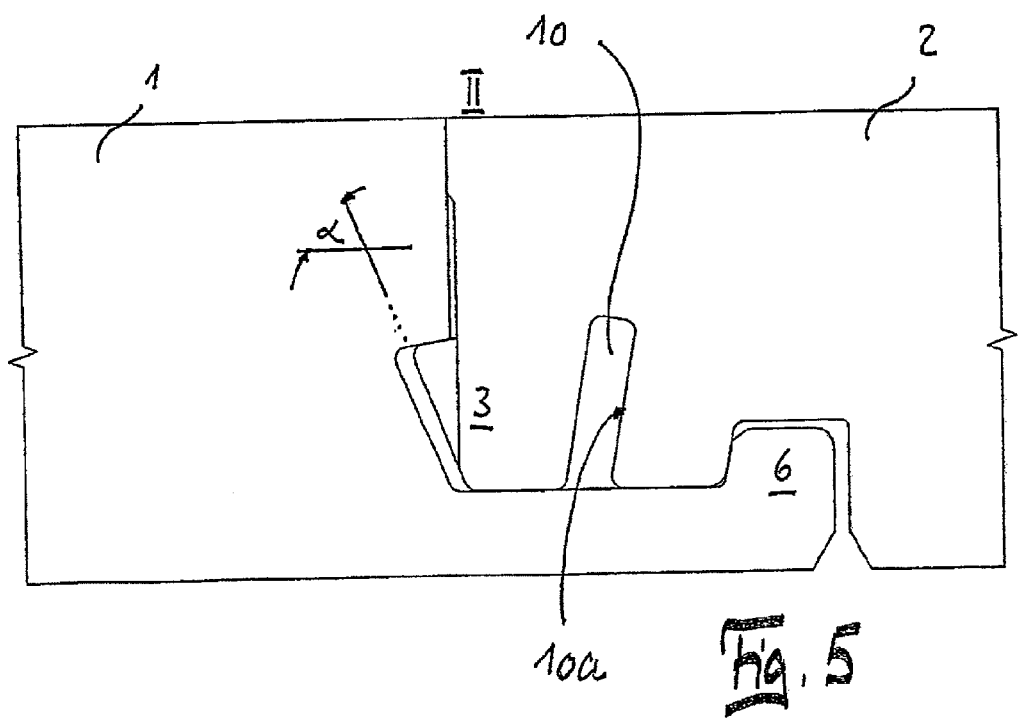
FIG. 5 shows a second variation of the panel according to FIGS. 2 and 3.

The locking of the two panels 1, 2 in the horizontal direction takes place by means of the hook elements 20, 21 produced through a step profiling by milling, and in the vertical direction via the tongue element 3 in connection with the locking edge 4 of the groove 9. On the shoulder 5, extending downward, of the hook element 21, an at least partially flat top surface 12 is embodied that interacts with a bearing surface 13 embodied on the hook element 20 on the opposite lateral edge I, which bearing surface projects backward behind the projection 6. The top surface 12 and the bearing surface 13 end in the same horizontal plane E, so that the panels 1, 2 connected to one another support each other. The profiling of the hook elements 20, 21 is chosen such that a preload is created in the joint, and the vertical mating surfaces 15, 16 of the panels 1, 2 are pressed against one another, so that there is no visible gap on the top side 18 of two panels 1, 2 connected to one another. In order to facilitate the joining of the panels 1, 2, the shoulder 6, projecting upward, of the hook element 20 and the shoulder 5, projecting downward, of the hook element 21 are chamfered or rounded on their edges. In order to simplify the manufacture for embodying the tongue element 3, either the slit 11 running horizontally (FIG. 4) or the slit 10 running essentially vertically (FIG. 5) can be continuous, i.e., extend over the full length L of the lateral edge II.

Figure 8:
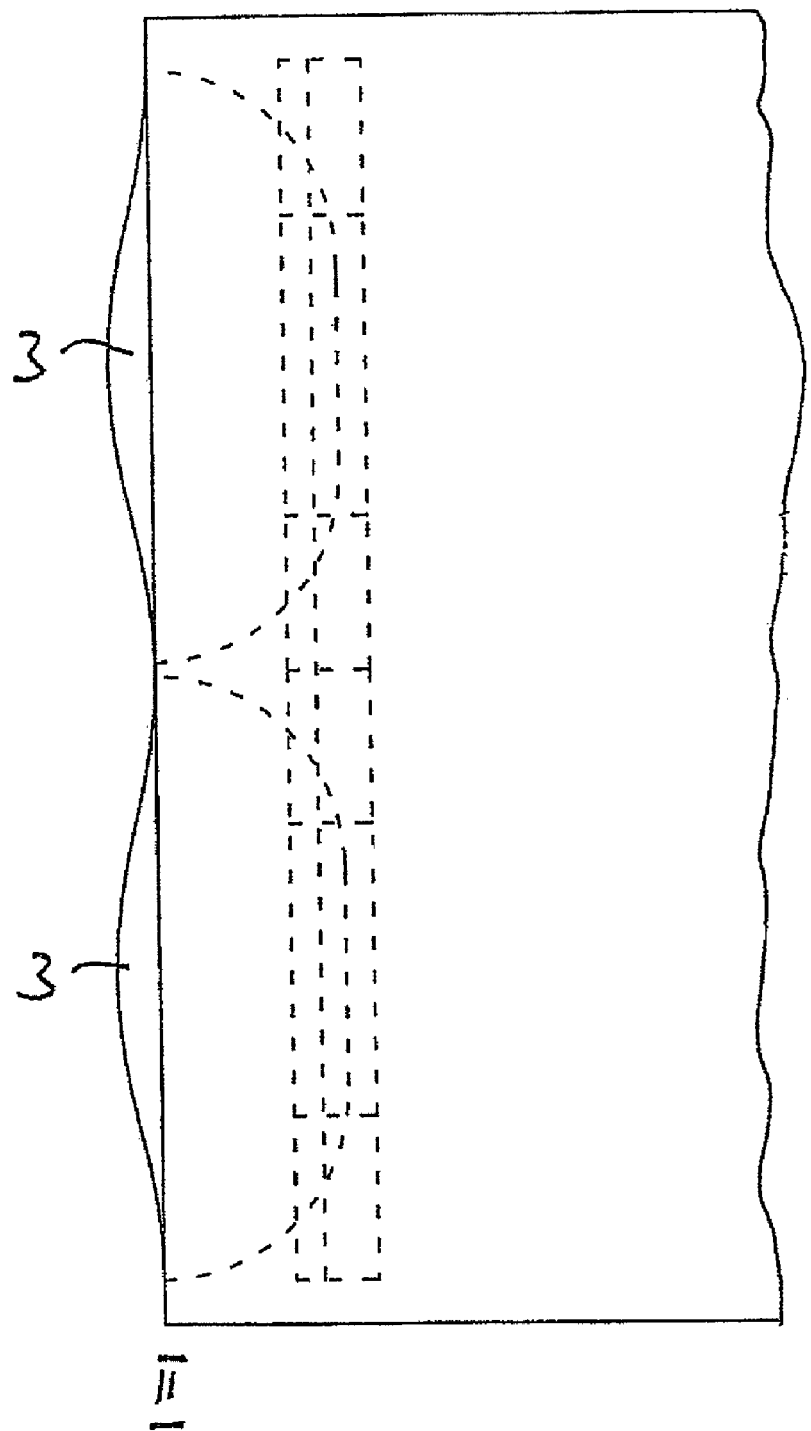
FIG. 8 shows a further embodiment of the panels.
Figure 9:
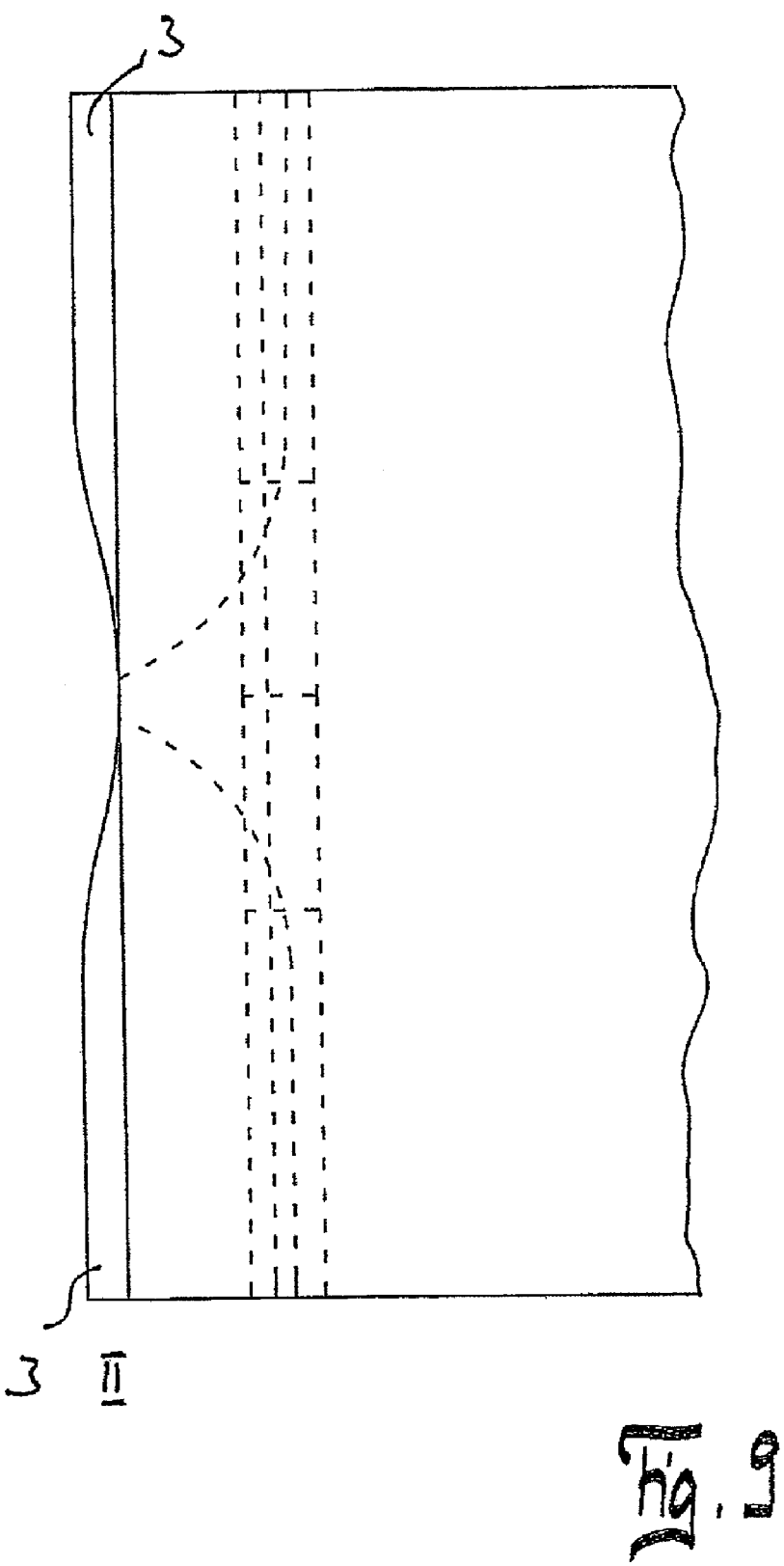
FIG. 9 shows a fourth embodiment of the panels.

The panel 2 is connected to the panel 1 already lying on the under-floor in that the panel 2 is fitted to the lateral edge I of the panel 1 and lowered in the direction of the under-floor by an essentially vertical joining motion. When the tongue element 3 with its lower edge 3d adjoins the top side 18 of the panel 1, the tongue element is pressed in the direction of the core 17 during the further joining motion when it touches the mating surface 15 because of its outer lateral edge 3c running at the angle α, so that the tongue element deflects in the horizontal direction H. The panel 2 is further lowered downward. When the tongue element 3 reaches a position opposite the groove 9, it springs out as a result of the restoring forces inherent in the material and then snaps into the groove 9, where it bears against the locking edge 4 with its top side 3e running essentially horizontally. At the same time, the hook elements 20, 21 engage until the top surface 12 is supported on the bearing surface 13. The panels 1, 2 are then connected and locked to each other. The inner wall 10a of the slit 10 serves as a limitation of the spring deflection for the tongue element 3, in order to prevent the pulling out of the connection between the tongue element 3 on its ends 3a, 3b and the core 17 because of an excessively wide plunging motion. The surface, i.e., the height and the width with which the ends 3a, 3b are connected to the core 17 determines the spring rate of the tongue element 3. As FIGS. 8 and 9 show, several tongue elements 3 can be embodied over the length L of the lateral edge II. FIGS. 8 and 9 show two embodied tongue elements 3. It is also easily conceivable to embody the tongue elements 3 shorter and to provide five, six or even seven or more tongue elements 3.

Figure 6:
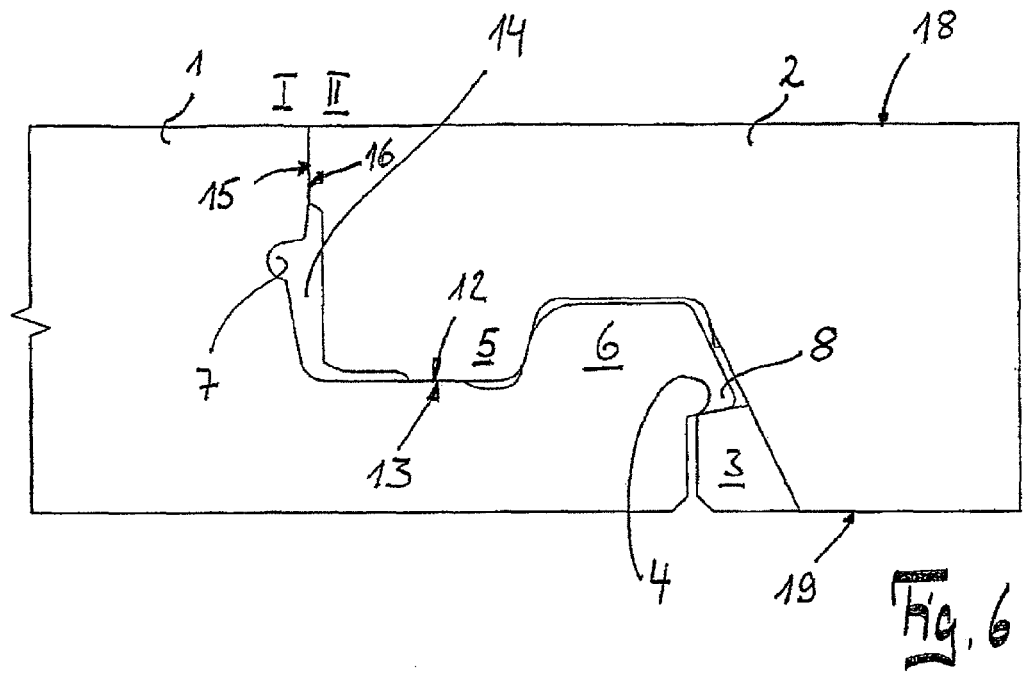
FIG. 6 shows a side view of two panels connected to one another according to a second exemplary embodiment.
Figure 7:
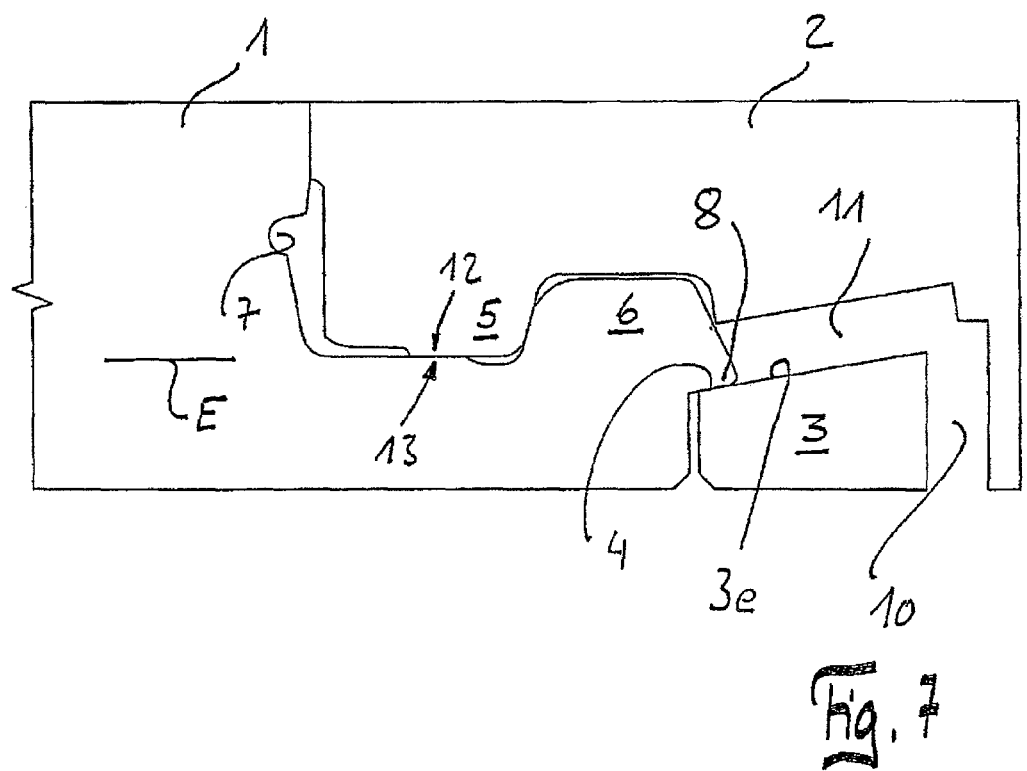
FIG. 7 shows a section of the panels connected to one another from FIG. 6.

In the exemplary embodiment shown in FIGS. 6 and 7, the tongue element 3 is embodied on the bottom side 19 of the panels 1, 2. The locking edge 4 on the lateral edge I is formed by a projection 8 on the shoulder 6. Here the exposure of the tongue element 3 also occurs through the slit 11 running essentially in the horizontal direction H and the slit 10 running in the vertical direction V. Here it is possible as well that one of the slits 10, 11 extends over the full length L of the lateral edge II to simplify the manufacturing process. In this embodiment, the vertical surfaces 15, 16 are machined on the lateral edges I, II such that a dust pocket 14 forms, an undercut 7 projecting into the core 17 being provided on the lateral edge I.

If the vertical slit 10 is embodied to be narrow enough, it is possible to keep the tongue element 3 connected to the core by only one of its ends 3*a* or 3*b*. This is indicated in the top view according to FIG. 9. An embodiment of this type has the advantage that the tongue element 3 can extend in the direction of the length L of the lateral edge II as well. The end 3*a* or 3*b* which is then free is then supported on the inner wall 10*a* of the slit 10.

Figure 2:
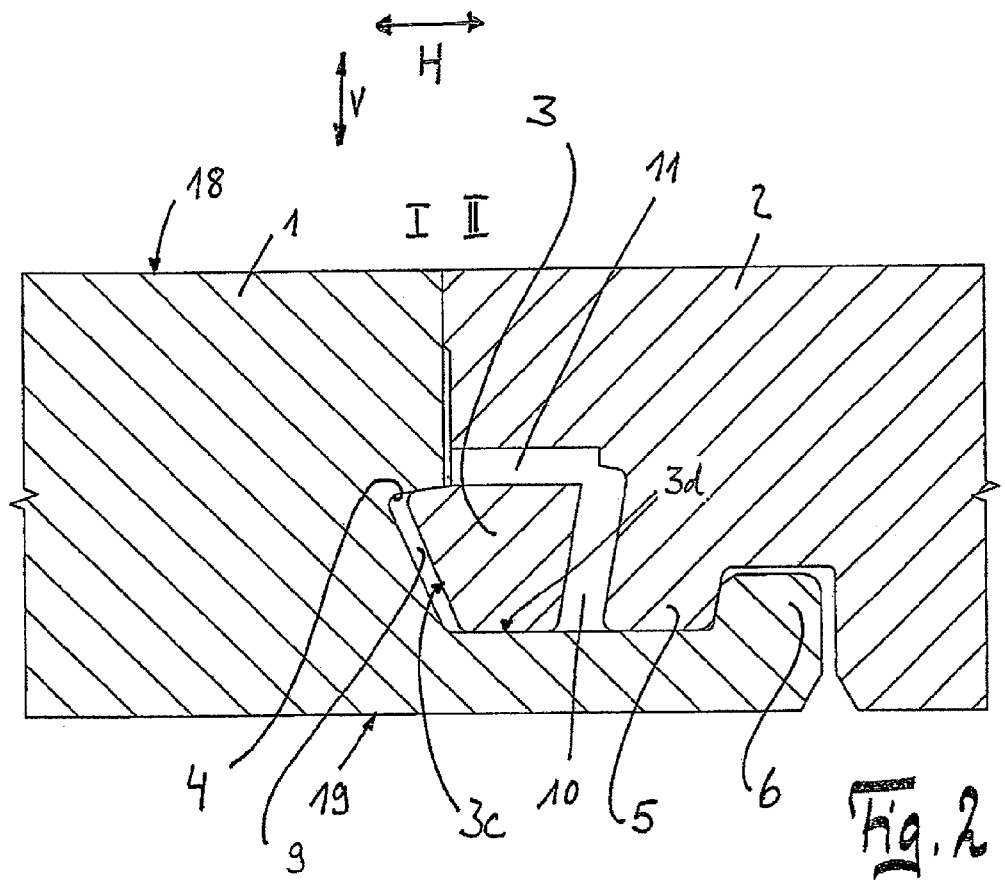
FIG. 2 shows a representation of two panels connected to one another in part section analogous to the line of cut II-II according to FIG. 1.
Figure 3:
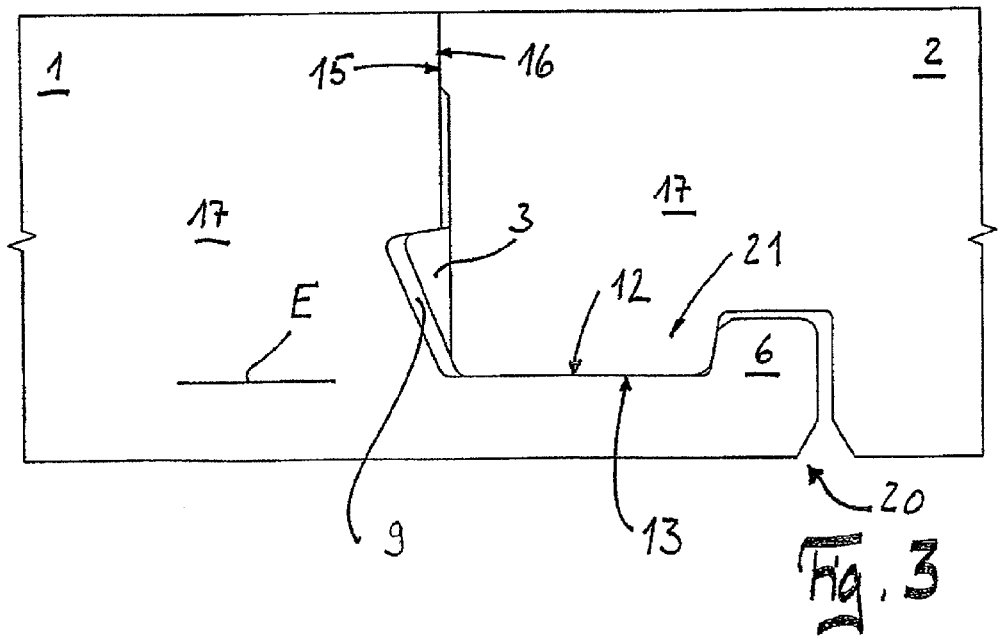
FIG. 3 shows a representation corresponding to FIG. 2 analogous to the line of cut III-III according to FIG. 1.

With the panel 1, 2 displayed in FIGS. 2 and 3, the tongue element 3 is shaped by means of tools slidable crosswise to the processing direction. Milling tools, laser tools or water-jet tools or even upright blades or broaches can be used as tools. With the exemplary embodiments according to FIGS. 4 and 5, only one slidable tool is required in each case, so that the respectively other exposure can be carried out by means of a conventional stationary tool. The area that is not exposed, that connects the tongue element 3 to the core 17 in one piece, is thereby reduced. It is thus also possible to adjust locking forces of different strengths. With all of the exemplary embodiments the locking is detachable by shifting the panels 1, 2 relatively to one another along the lateral edges I, II or by inserting a release pin (not shown) laterally into the joint.

The panels 1, 2 are customarily provided with a pattern on their top side 18, which pattern can be printed directly onto the top side 18. The pattern is customarily covered by an antiabrasion layer, into which a structuring corresponding to the pattern can be embossed.

This type of locking described above is preferably provided on the transverse side of panels 1, 2, which can be connected to one another on their longitudinal side by angling and pivoting downward onto the under-floor, as described in DE 102 24 540 A1. It is also conceivable, however, to embody this profiling both on the longitudinal sides and the transverse sides, so that the panels can be connected and locked to one another on all lateral edges by a purely vertical joining motion.

The invention claimed is:

1. A panel comprising a core made of wood material or a wood material/plastic mixture, a top side and a bottom side, the panel further including on at least two opposite lateral edges a profiling corresponding to one another such that two identical panels can be connected and locked to one another by an essentially vertical joining motion in a horizontal and vertical direction, the locking in the vertical direction can be brought about by at least one tongue element movable in the horizontal direction, which snaps into place during the joining motion behind a locking edge extending essentially in the horizontal direction, the tongue element being formed in one piece out of the core at a first lateral edge and is free with respect to the core in a direction of the top side and in a direction of a second lateral edge opposite to the first lateral edge, and connected to the core on at least one of its two longitudinal ends.

2. The panel according to claim 1, wherein the tongue element is connected to the core on its two ends.

3. The panel according to claims 1, wherein the tongue element is exposed with respect to the core by an essentially horizontal slit and an essentially vertical slit.

4. The panel according to claim 1, wherein a plurality of tongue elements, spaced apart from one another, is provided over a length of one of the lateral edges.

5. The panel according to claim 1, wherein the horizontal locking occurs by hook elements corresponding to one another.

6. The panel according to claim 5, wherein a hook element on the second lateral edge having the locking edge is embodied by a shoulder projecting in a direction of the top side, and the hook element on the first lateral edge having the tongue element is embodied by a shoulder directed in a direction of the bottom side.

7. The panel according to claim 6, wherein the shoulder projecting downward has an at least partially flat top surface that ends in a same horizontal plane as a bearing surface embodied on an opposite lateral edge, so that panels connected to one another support each other.

8. The panel according to claim 6, wherein a preload is produced by the hook elements at a joint of two panels connected to one another such that the lateral edges of the panels are pressed against one another with vertical surfaces in an area of the top side.

9. The panel according to claim 1, wherein an outer edge of the tongue element runs tilted at an angle ($\alpha$) to the top side.

10. The panel according to claim 1, wherein the locking edge running essentially horizontally is a sidewall of a groove introduced into the second lateral edge.

11. The panel according to claim 10, wherein the locking edge running essentially horizontally is embodied on a shoulder.

12. The panel according to claim 11, wherein the tongue element ends on the bottom side.

13. A panel comprising a core, a top side and a bottom side, a profiling, and at least one tongue element movable in a horizontal direction, which snaps into place during a joining motion behind a locking edge extending essentially in a horizontal direction of another panel, the tongue element being formed in one piece from the core and being free with respect to the core in a direction of the top side and in a direction of an opposite lateral edge to form an open space along a longitudinal length of the at least one tongue element and separating the at least one tongue element from the core, and connected to the core in the direction of a lateral edge of the panel.

14. The panel according to claim 13, wherein an outer edge of the tongue element is tilted at an angle $\alpha$ with respect to the top side.

15. The panel according to claim 13, wherein the tongue element is exposed with respect to the core by the open space which is an essentially horizontal slit, and an essentially vertical slit.

16. The panel according to claim 15, wherein the tongue element is connected on its ends to the core.

17. The panel according to claim 13, wherein on a lateral edge opposite the tongue element is a groove extending essentially in a horizontal direction, an upper sidewall of the groove embodies a locking edge running essentially horizontally.

18. The panel according to claim 17, wherein a groove bottom of the groove runs parallel to an outer edge of the tongue element.

19. The panel according to claim 18, further comprising hook elements produced through a step profiling by milling, and in a vertical direction via the tongue element in connection with the locking edge of the groove.

20. The panel according to claim 19, wherein the hook elements are prestressed.

* * * * *